United States Patent
Kwak

[11] Patent Number: 5,875,001
[45] Date of Patent: Feb. 23, 1999

[54] HDTV RECEIVER

[75] Inventor: Heung Sik Kwak, Sungnam-si, Rep. of Korea

[73] Assignee: LG Electronics Inc., Seoul, Rep. of Korea

[21] Appl. No.: 702,095

[22] Filed: Aug. 23, 1996

[30] Foreign Application Priority Data

Aug. 25, 1995 [KR] Rep. of Korea .................. 1995/26657

[51] Int. Cl.[6] ....................................................... H04N 5/21
[52] U.S. Cl. ............................................ 348/607; 348/608
[58] Field of Search .................................. 348/607, 608, 348/609, 665, 666, 667, 668; H04N 5/21, 5/213, 9/78, 5/217

[56] References Cited

U.S. PATENT DOCUMENTS

| | | | |
|---|---|---|---|
| 5,086,340 | 2/1992 | Citta et al. ............................. | 348/607 |
| 5,087,975 | 2/1992 | Citta et al. ............................. | 348/607 |
| 5,132,797 | 7/1992 | Citta ...................................... | 348/607 |
| 5,151,785 | 9/1992 | Citta ...................................... | 348/607 |
| 5,162,900 | 11/1992 | Citta ...................................... | 348/607 |
| 5,258,838 | 11/1993 | Citta ...................................... | 348/607 |
| 5,452,015 | 9/1995 | Hulyalkar ............................... | 348/608 |
| 5,508,752 | 4/1996 | Kim et al. .............................. | 348/608 |
| 5,512,957 | 4/1996 | Hulyalkar ............................... | 348/607 |
| 5,546,132 | 8/1996 | Kim et al. .............................. | 348/607 |
| 5,572,249 | 11/1996 | Ghosh .................................... | 348/606 |
| 5,572,262 | 11/1996 | Ghosh .................................... | 348/607 |
| 5,594,496 | 1/1997 | Nielsen et al. ......................... | 348/607 |
| 5,648,822 | 7/1997 | Hulyalkar ............................... | 348/607 |

*Primary Examiner*—Chris Grant
*Attorney, Agent, or Firm*—Loeb & Loeb LLP

[57] ABSTRACT

A high definition television receiver includes a comb filter for receiving trellis coded HDTV data, the comb filter turning on if there is interference from an NTSC signal having a co-channel in the data to thereby remove the interference, and the comb filter turning off if there is no interference to thereby pass the received HDTV data; a determining part for determining if the comb filter is turned on/off and providing a comb filter ON/OFF signal according to the determination result; and a united trellis decoder having united state transitions of a partial response trellis decoder and an optimal trellis decoder, the united trellis decoder having a signal group divided into signal groups of the partial response trellis decoder and the optimal trellis decoder, thereby operating as the partial response trellis decoder according to the comb filter ON signal and operating as the optimal trellis decoder according to the comb filter OFF signal input from the determining part.

7 Claims, 10 Drawing Sheets

HDTV RECEIVER

BACKGROUND OF THE INVENTION

1. Field of the Invention

The present invention relates to a high definition television (HDTV) receiver, and more particularly, to an HDTV receiver employing a single decoder as both an optimal trellis decoder and a partial response trellis decoder.

2. Discussion of the Related Art

A recently proposed transceiver of the grand alliance (GA) HDTV system has an 8 vestigial side band (VSB) transmitting system. In the 8 VSB transmitting method, input data are set for a trellis coding, and then converted into an 8 level signal, which is then transmitted in the VSB method. That is, when two-bit data are input, the trellis encoder does not code the higher bit, but ½ convolutional codes the lower bit in order to make it into two bits, thereby outputting three bits in total. The three bits are trellis coded modulated (TCM), which are mapped into highly error-correctable levels, namely, 8 levels. The TCM is the modulation of the convolutional coded signal, that is, a channel coding method capable of obtaining a signal-to-noise ratio of over about 3 dB without a loss of the channel bandwidth. Meanwhile, the signal transmitted in the VSB method is decoded using a trellis decoder. If there is an NTSC broadcasting station having a co-channel near the HDTV broadcasting station, the co-channel NTSC interference occurs. In this case, a comb filter, an NTSC rejection filter, is used for removing the co-channel NTSC interference. Accordingly, different decoders are used for decoding the data when using the comb filter and when not using it.

Figure 1:
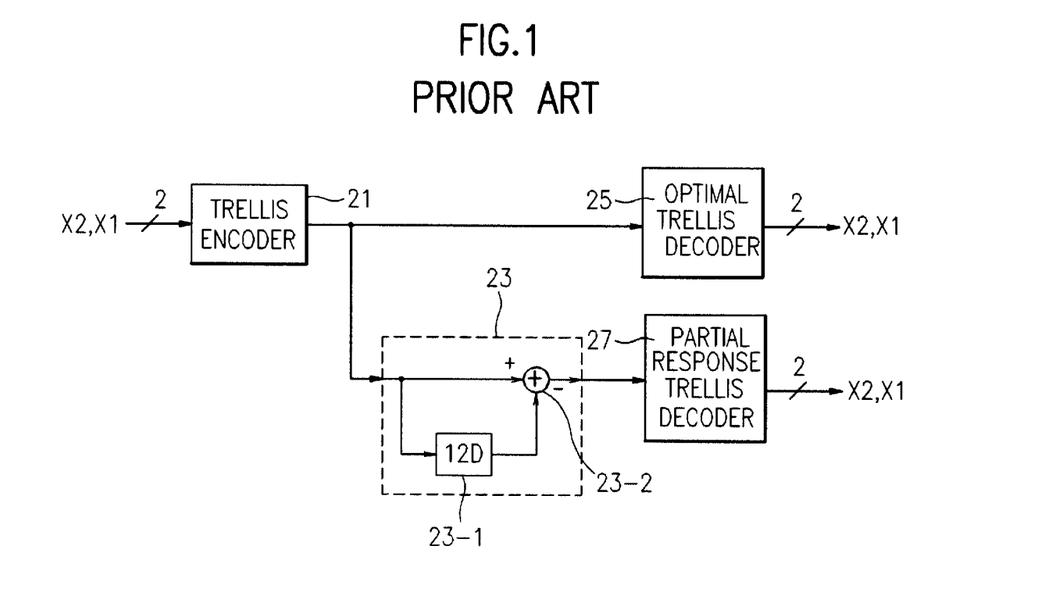
FIG. 1 is a block diagram of a conventional trellis encoder and decoder.
Figure 2:
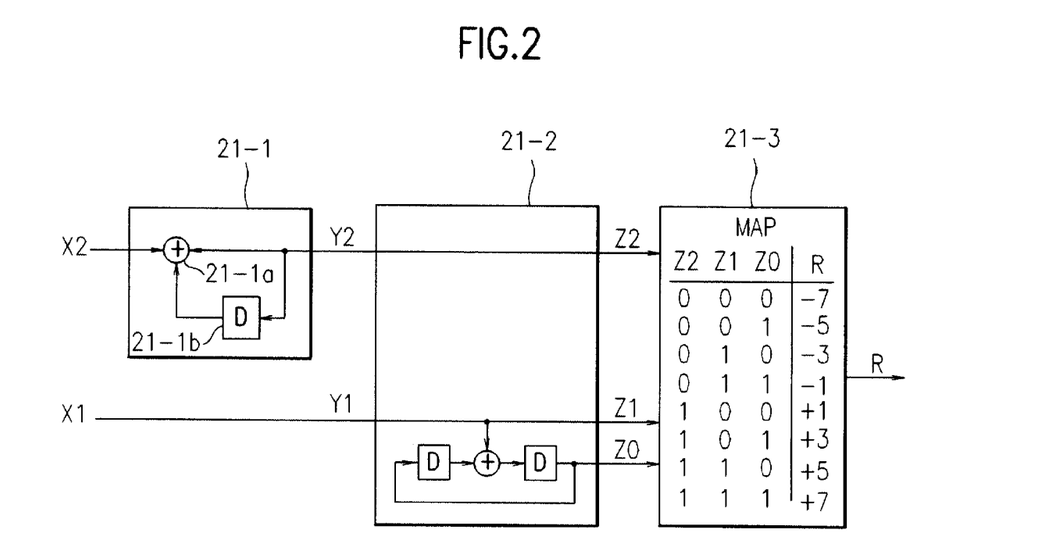
FIG. 2 is a detailed block diagram of the trellis encoder of FIG. 1.

FIG. 1 shows a block diagram showing the relations between a trellis encoder 21, comb filter 23, optimal trellis decoder 25 and partial response trellis decoder 27. FIG. 2 shows a detailed block diagram of the trellis encoder of FIG. 1.

In FIG. 2, the trellis encoder 21 includes a precoder 21-1, a convolutional encoder 21-2, and a TCM mapper 21-3. The higher bit X2 of the 2 bit signals X2, X1 input to the trellis encoder 21 is differentially encoded in the precoder 21-1 so that the partial response trellis decoder 27 can exactly decode the higher bit X2 which is not encoded, and then input to the TCM mapper 21-3 Z2. One lower bit X1 becomes 2 bits Z1, Z0 via the convolutional encoder 21-2, which are input to the TCM mapper 21-3. When the higher 1 bit X2 is input to the precoder 21-1, the summer 21-1a sums the input higher bit X2 and the data previously stored in the delayer 21-1b and then outputs it. At this time, "0" is output when the two values are the same, and "1" is output when the two values are different. Therefore, the trellis decoder can exactly recognize the value of the higher one bit X2 if only performing a hard decision upon the input data.

Figure 3:
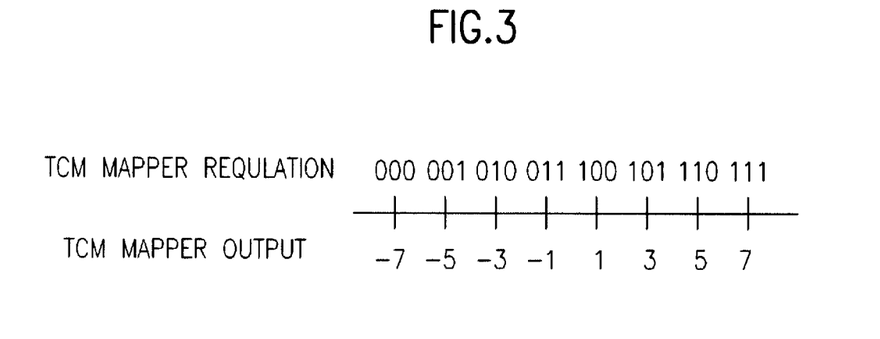
FIG. 3 illustrates a TCM mapper of the trellis encoder of FIG. 1.
Figure 4:
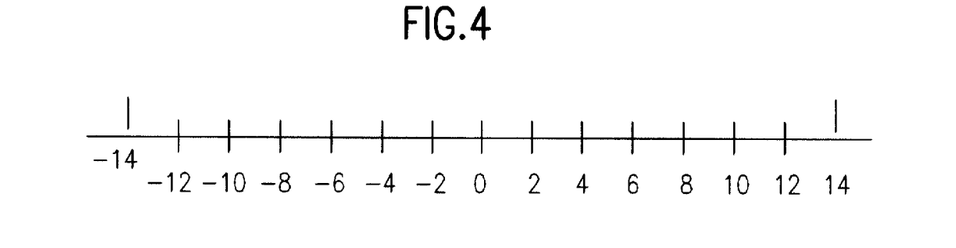
FIG. 4 illustrates the output signal level of the comb filter according to the trellis decoder of FIG.1.

As illustrated in FIG. 3, the TCM mapper receiving three bits Z2, Z1, Z0 transmits the 8 level voltage signal corresponding to the input data as illustrated in FIG. 3. Therefore, when the trellis encoder 21 of the transmitting part transmits the 8 level signal, the trellis decoders 25, 27 of the receiving part decode it into the two bit signals X2, X1 prior to encoding by the trellis encoder 21. Here, because the co-channel NTSC interference occurs in the area of the adjacent HDTV broadcasting station having the co-channel, the trellis decoder removes the NTSC interference using the comb filter 23 made up with a 12 symbol delayer 23-1 for delaying the value output from the TCM mapper 21-3, and the summer 23-2 for obtaining the difference of the value output from the current TCM mapper 21-3. Here, when the output of eight level from the TCM mapper 21-3 of the trellis encoder 21 passes the comb filter 23, the output is converted into 15 levels as illustrated in FIG. 4. Accordingly, the decoded data should be decoded using each different decoder when both using the comb filter 23 and not using it. That is, if there is no interference by the NTSC signal having the co-channel in the received signal, the signal is decoded by four state optimal trellis decoder 25. If there is interference by the NTSC signal having the co-channel, the signal is decoded by the 8 state partial response trellis decoder 27 via the comb filter 23. Here, the optimal trellis decoder 25 performs decoding using the signal mapper as same as FIG. 3.

Figure 5:
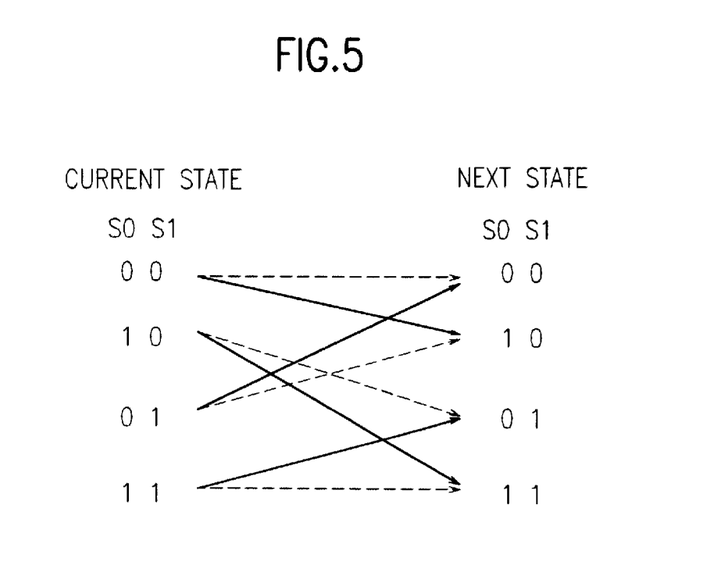
FIG. 5 is a state transition of a general optimal trellis decoder.
Figure 6:
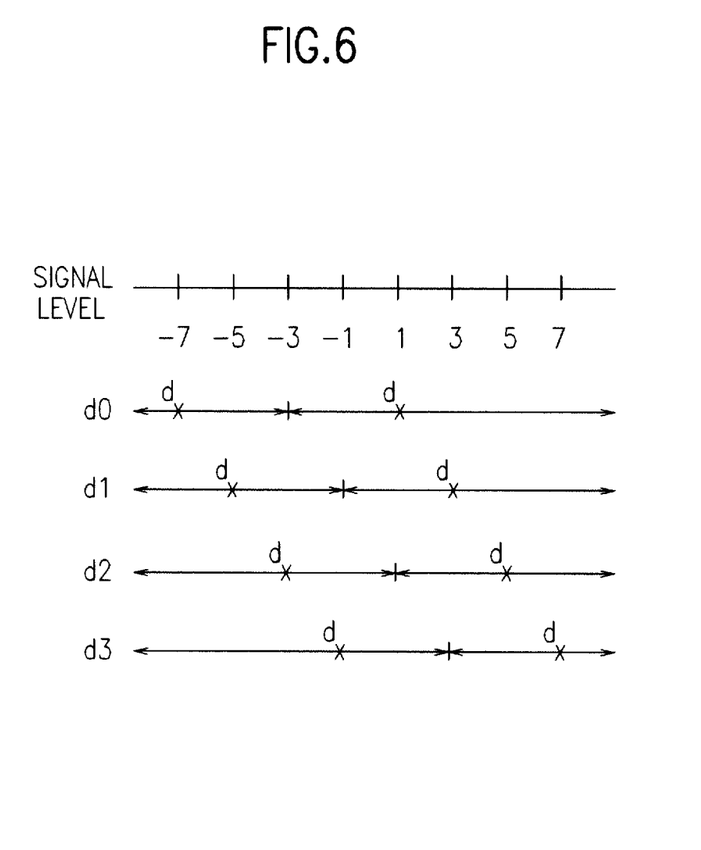
FIG. 6 is a concept diagram of a general optimal trellis decoder's signal group and distance calculator.

The state transition is illustrated in FIG. 5. The signal group is shown in FIG. 6.

Here, the capital reference characters S0, S1 indicate memory states of the trellis encoder 21. The small letters s0, s1, s2, s3 indicate signal groups. That is, s0={-7, 1}, s1={-5, 3}, s2={3, 5}, s3={-1, 7}, and the euclidean distance values of respective groups are d0, d1, d2, d3.

Figure 7:
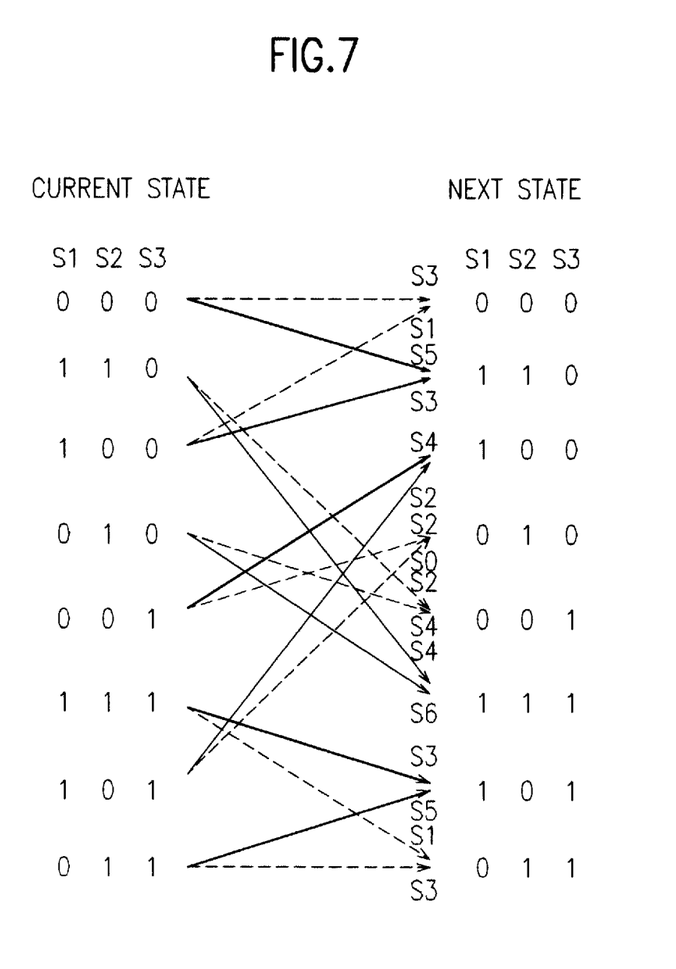
FIG. 7 is a state transition of a general partial response trellis decoder.
Figure 8:
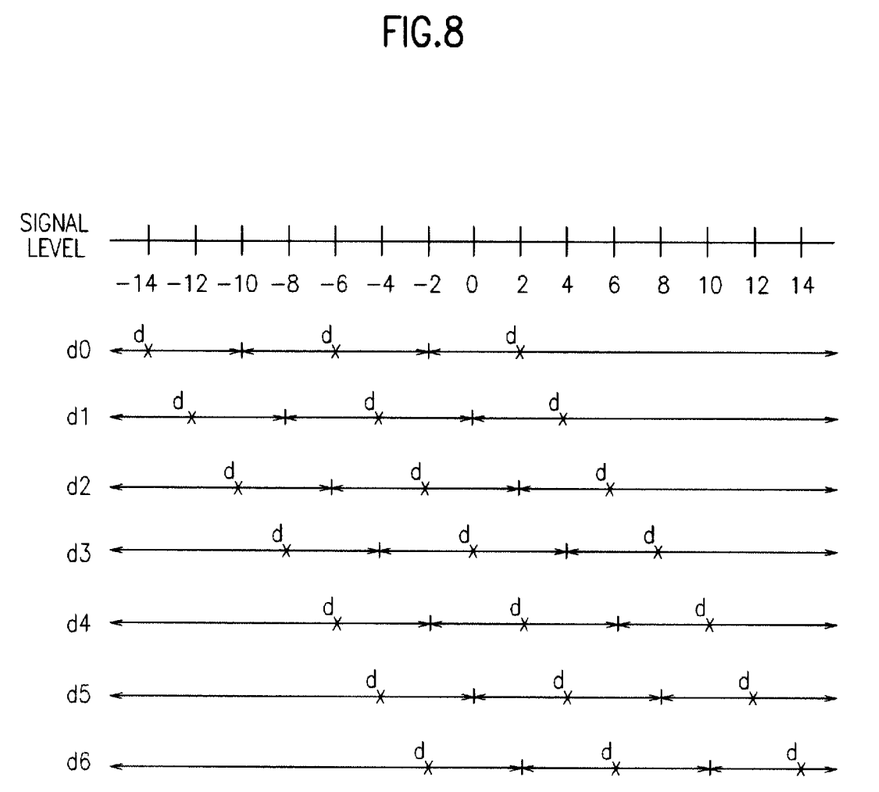
FIG. 8 is a concept diagram of a general partial response trellis decoder's signal group and distance calculator.

Meanwhile, the partial response trellis decoder 27 performs the decoding operation using the signal passing through the comb filter 23 as illustrated in FIG. 4. The state transition is shown in FIG. 7, and the signal group is shown in FIG. 8. Likewise, the capital letters S1, S2, S3 indicate the memory states of the trellis encoder 21. The small letters s0, s1, s2, s3, s4, s5, s6 indicate the signal groups. That is, s0={-14, -6, 2}, s1={-12, -4, 4}, s2={-10, -2, 6}, s3={-8, 0, 8}, s4={-6, 2, 10}, s5={-4, 4, 12}, s6={-2, 6, 14}.

The above-mentioned HDTV receiver should have two trellis decoders such as the optimal trellis decoder and the partial response trellis decoder in accordance with the operation of the comb filter whether there is the NTSC signal having the co-channel or not. Therefore, twice as much hardware is required for respectively realizing the two kinds of trellis decoders, and the process is complicated because of the two kinds of control signals to process those outputs.

SUMMARY OF THE INVENTION

Accordingly, the present invention is directed to a high definition television receiver that substantially obviates one or more of the problems due to limitations and disadvantages of the related art.

An object of the present invention is to provide a high definition television receiver with reduced hardware requirements.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the high definition television receiver includes a comb filter for receiving trellis coded HDTV data, the comb filter turning on if there is interference from an NTSC signal having a co-channel in the data to thereby remove the interference, and the comb filter turning off if there is no interference to thereby pass the received HDTV data; a determining part for determining if the comb filter is turned on/off and providing a comb filter ON/OFF signal according to the determination result; and a united trellis decoder having united state transitions of a partial response trellis decoder and an optimal trellis decoder, the united trellis decoder having a signal group divided into signal groups of the partial response trellis decoder and the optimal trellis decoder, thereby operating as the partial response trellis decoder according to the comb filter ON signal and operating as the optimal trellis decoder according to the comb filter OFF signal input from the determining part.

To further achieve these and other advantages and in accordance with the purpose of the present invention, as embodied and broadly described, the HDTV receiver of the invention has a united trellis decoder made up with transitions of a partial response trellis decoder and an optimal trellis decoder. A signal group used in the state transition of the united trellis decoder are the signal group for a partial response trellis decoder, and that for the optimal trellis decoder. The comb filter receives the coded HDTV data. The comb filter is turned on if there is an interference by the NTSC signal having a co-channel in the data to thereby remove the interference. If there is no interference, the comb filter is turned off to pass the received HDTV data.

A determining part determines the state of turn ON/OFF of the comb filter, and provides the comb filter ON signal or the comb filter OFF signal to the above united trellis decoder.

When the comb filter is operated by the comb filter ON signal output from the determining part, the united trellis decoder operates as a partial response trellis decoder. When the comb filter is not operated, the united trellis decoder operates as an optimal trellis decoder.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF PREFERRED EMBODIMENTS

Reference will now be made in detail to the preferred embodiments of the present invention, examples of which are illustrated in the accompanying drawings.

Figure 9A:
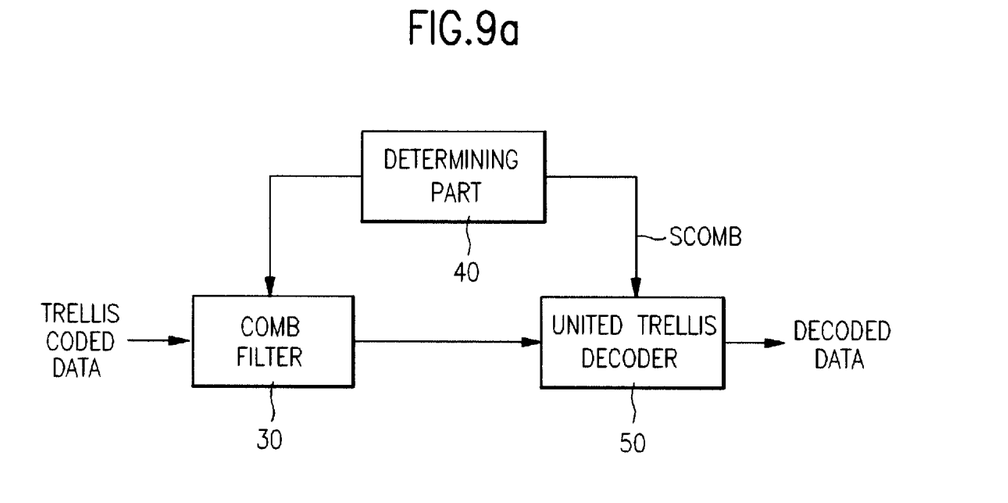
FIG. 9a is a schematic block diagram of an HDTV receiver of the invention.

Referring to FIG. 9A, an HDTV receiver of the present invention includes a comb filter 30, a determining part 40 and a united trellis decoder 50. The comb filter 30 receives the trellis coded HDTV data, turning on if there is an interference by the NTSC signal having a co-channel in the data to thereby remove the interference and turning off to pass the received HDTV data if there is no interference. The determining part 40 determines if the comb filter 30 is turned on/off and provides a comb filter ON/OFF signal Scomb according to the determination result. The united trellis decoder 50 has the united state transitions of a partial response trellis decoder and optimal trellis decoder.

A signal group used in the united state transition is divided into two portions: one for the partial response trellis decoder and the other for the optimal trellis decoder. There is the united trellis decoder 50 operating as the partial response trellis decoder or the optimal trellis decoder according to the comb filter ON/OFF signal Scomb of the determining part 40.

Figure 9B:
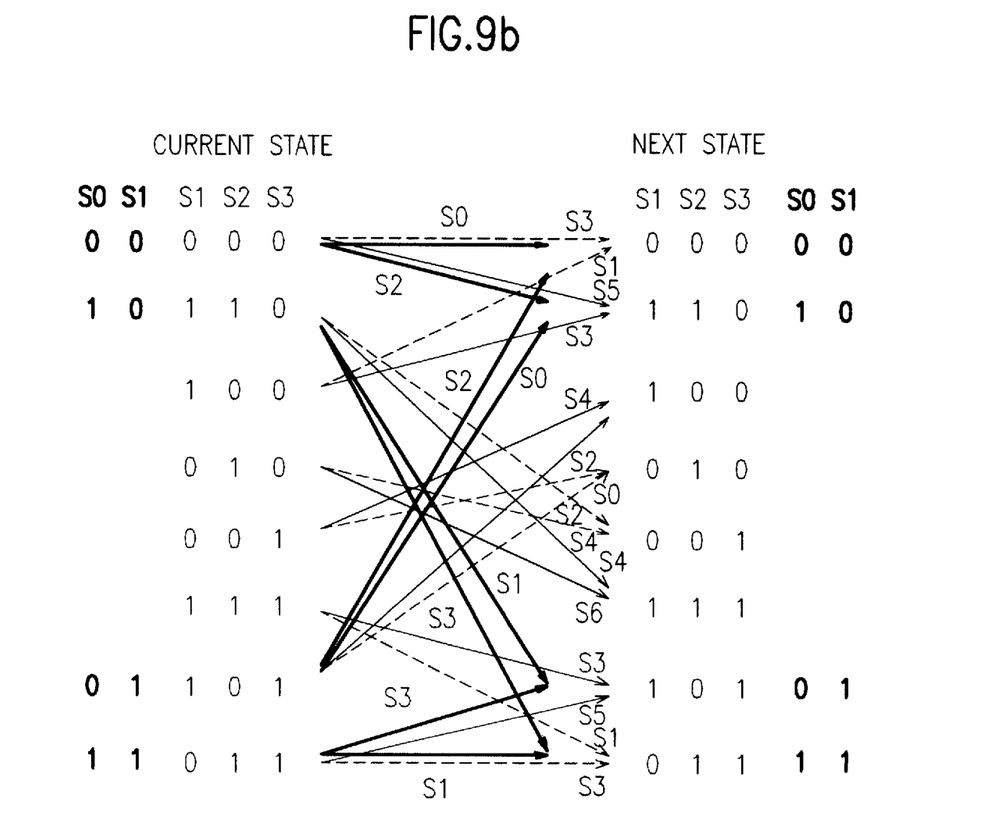
FIG. 9b is a state transition of a united trellis decoder of the invention.
Figure 10:
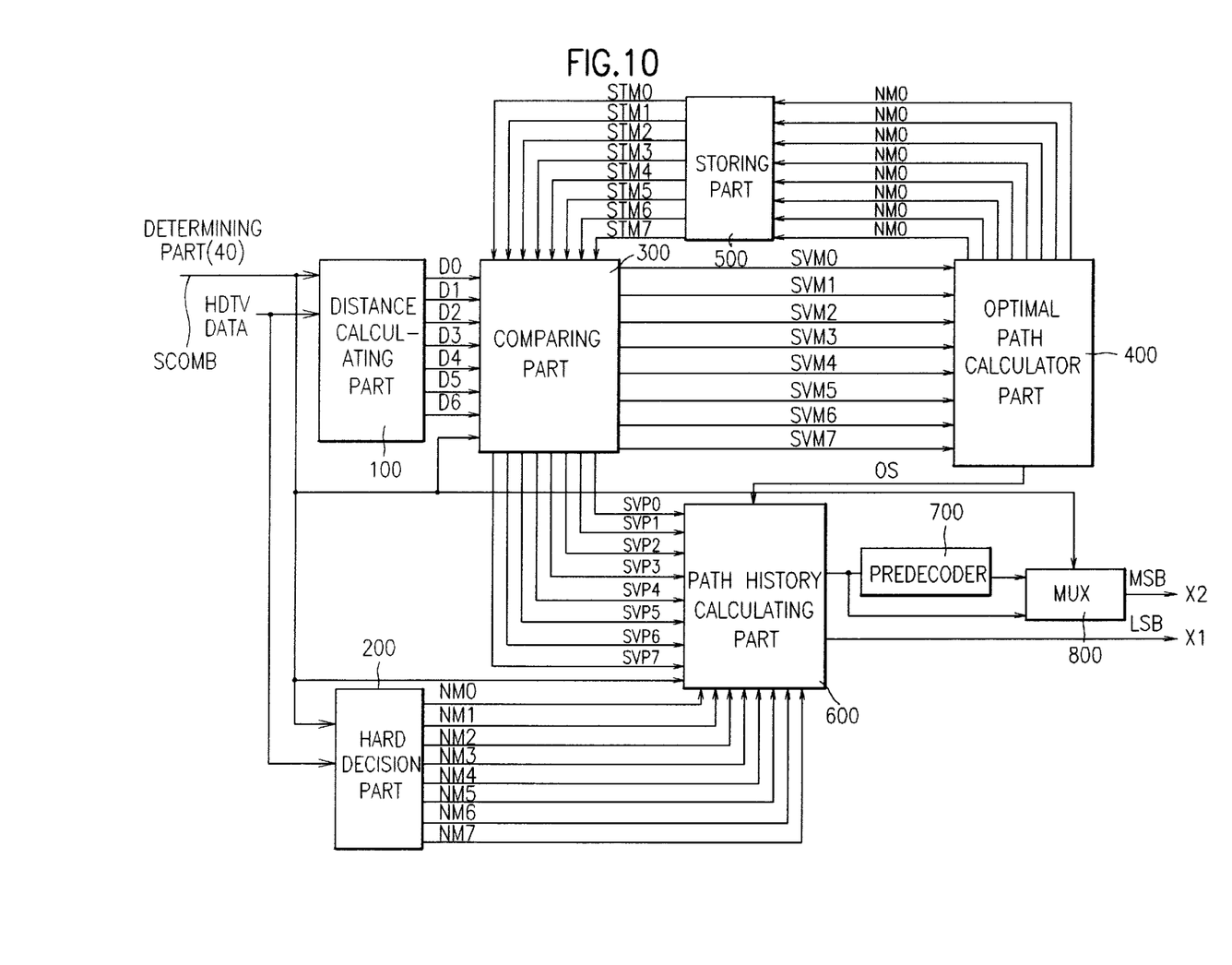
FIG. 10 is a block diagram of the united trellis decoder of the invention structured using the state transition of FIG. 9.

As illustrated in FIG. 9A, the signal groups of the above state transition is classified into two types of FIG. 6 and FIG. 8. That is, in the state transition of FIG. 9B, the signal group of the bold line and letter corresponds to the state transition of the optimal trellis decoder of FIG. 5, and the signal group of the thin line and letter corresponds to the state transition of the partial response trellis decoder of FIG. 7. The united trellis decoder of FIG. 10 is made using the state transition of FIG. 9b and the signal groups of FIG. 6 and FIG. 8. FIG. 10 is the block diagram of the whole united trellis decoder 50 for HDTV receiver of the invention.

In FIG. 10, the comb filter ON/OFF signal discriminates how the data should be input to the united trellis decoder in case the comb filter 30 operates by the interference of the NTSC signal having the co-channel, and when there is no or weak interference by the co-channel NTSC signal. The present invention, as illustrated in FIG. 10, will now be described. A distance calculating part 100 outputs a signal value output from the transmission part's trellis encoder by the comb filter ON/OFF signal, namely, the euclidean distance value d0 to d3 from the received HDTV data, or outputs the euclidean distance value d0 through d6 from the signal value which is filtered and output from the comb filter. A hard decision part 200 outputs data that indicates whether the higher bit is the same or different from the previous data according to the signal value output from the trellis encoder by the comb filter ON/OFF signal Scomb, or outputs data that indicates whether the higher bit is the same as or different from the previous data according to the signal value output from the comb filter. A comparing part 300 sums the euclidean distance value output from the distance calculating part 100 and a store metric value, which is stored in a storing part 500 at each transition, and compares each state to output by finding a survival metric svm0 through svm7, which has a minimum metric value and a survival path svp0 through svp7. An optimal path calculating part 400 selects an optimal survival path, i.e., a path which has a minimum metric value of every state output from the comparing part 300, outputs the optimal survival path selecting signal OS, normalizes the survival metric value of each state by the minimum metric value, and then stores the value in the storing part 500. A path history calculating part 600 selects one of the survival paths output from the comparing part 300 by the survival path selecting signal OS output from the optimal path calculating part 400, chases the selected optimal path, calculates the survival path value of the first observing section, and then outputs 2 bits prior to convolutional encoding by the trellis encoder. A differential decoder 700 differentially decodes the higher bit output from the path history calculating part 600. A multiplexer 800 selects the higher bit output from the path history calculating part 600 in accordance with the comb filter ON/OFF signal or selectively outputs the higher bit output from the differential decoder 700.

Figure 11:
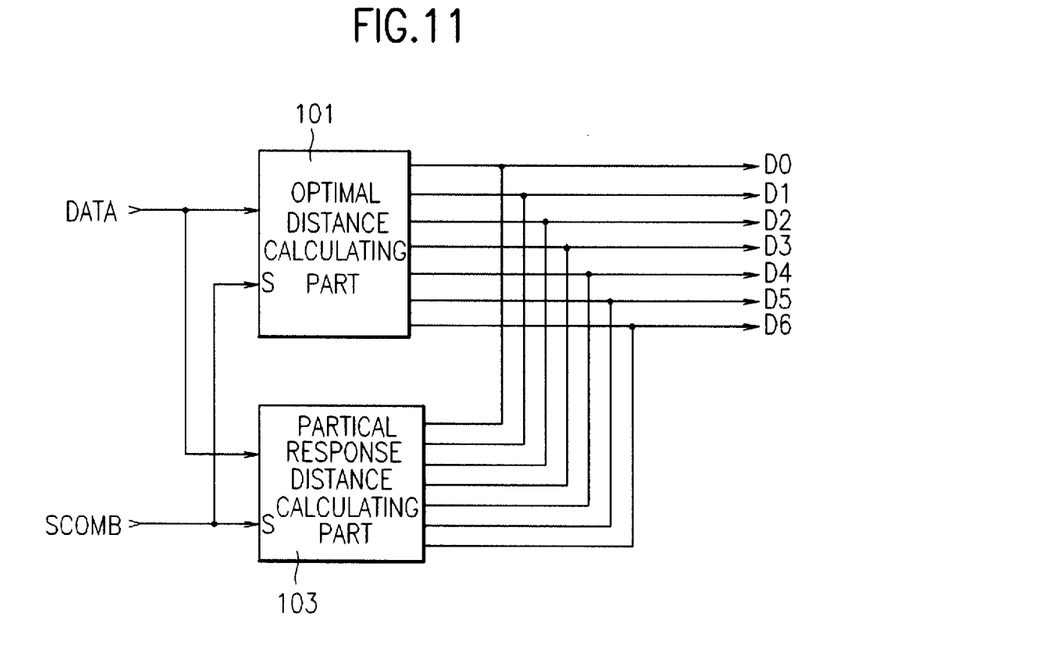
FIG. 11 is a detailed block diagram of the distance calculator of FIG. 10.

As illustrated in FIG. 11, the distance calculating part 100 includes an optimal distance calculating part 101 for outputting a euclidean distance value d0 through d3 in accordance with the signal value, namely, the received HDTV data output from the selected trellis encoder according to the comb filter ON/OFF signal Scomb; and a partial response distance calculating part 103 for outputting the euclidean distance value d0 through d6 in accordance with the signal value filtered and output from the comb filter 30.

Figure 12:
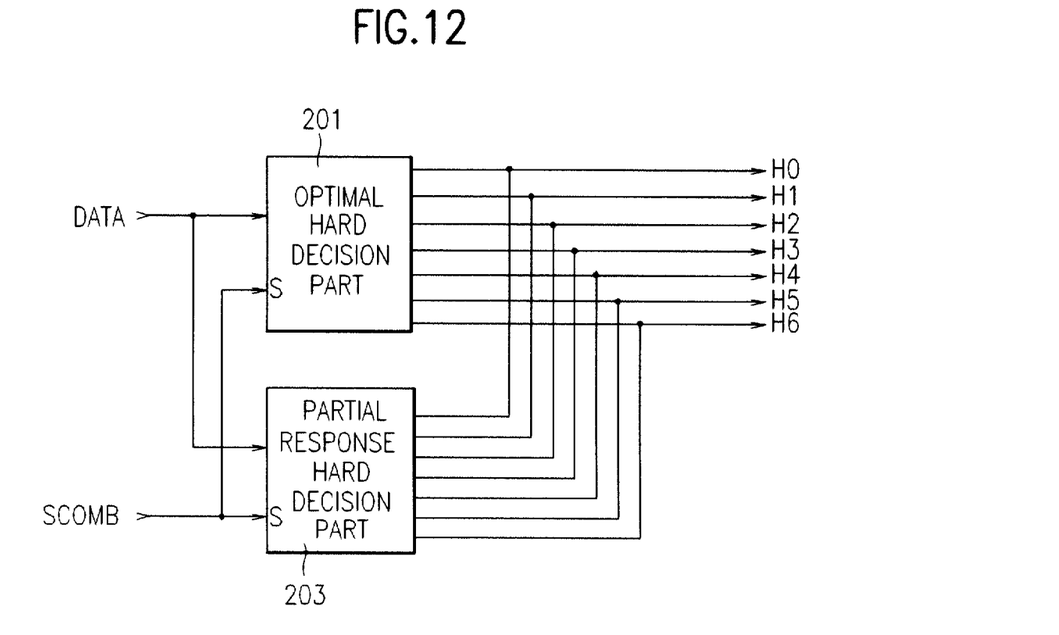
FIG. 12 is a detailed block diagram of the hard decision part of FIG. 10.

As illustrated in FIG. 12, the hard decision part 200 includes an optimal hard decision part 201 for providing a corresponding hard decision signal by hard-deciding the signal, which is selected according to the comb filter ON/OFF signal Scomb from the determining part 40 and output from the trellis encoder; and a partial response hard decision part 203 for providing the corresponding hard decision signal by hard-deciding the signal output from the comb filter 30, namely, the filtered HDTV data.

Figure 13:
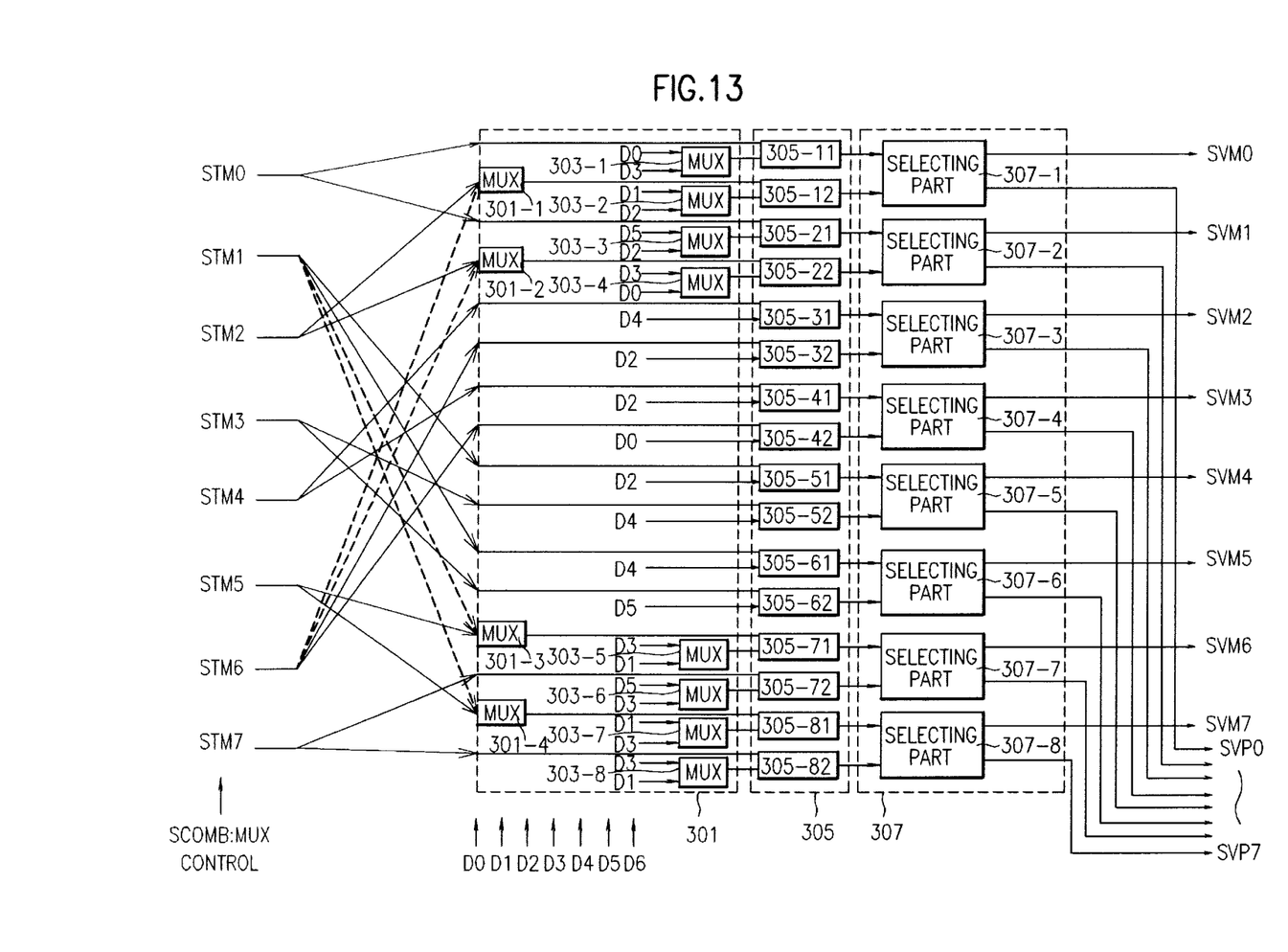
FIG. 13 is a detailed block diagram of the comparing part of FIG. 10.

As illustrated in FIG. 13, the comparing part 300 sums the previously accumulated distance value stm0 through stm7 of each state when the euclidean distance value d0 through d6 is output from the distance calculating part 100 to thereby calculate the branch metric value which is the current distance value. Here, as two paths meet at each state, the current distance value of the two paths at each state should be calculated, and then the path having the smaller value of the calculated current distance values is selected as the survival path. Therefore, the value of the survival path selected at each state is applied to the path history calculating part 600. The metric value of the survival path selected at each state is applied to the optimal path calculating part 400. Simultaneously with the selection of the optimal survival path in the optimal path calculating part 400, the survival metric value of each state is normalized by the selected minimum metric value and then stored by the storing part as the previously accumulated distance value. The comparing part 300 repeats this operation by each state of the observing section. Therefore, the comparing part 300 includes a path changing part 301 for properly changing the path of the data input according to the comb filter ON/OFF signal Scomb so that the optimal trellis decoder and the partial response trellis decoder can operate; a summing part 305 has a plurality of value sets (305-11), (305-21, 305-22), (305-31, 305-32), (305-41, 305-42), (305-51, 305-52), (305-61, 305-62), (305-71, 305-72), (305-81, 305-82) for calculating the branch metric value by summing each stored metric value and euclidean distance value, which are input through the path changing part 301 and stored in the storing part 500 by each state; and a selecting part 307 for comparing the two branch metric values of each set input from the summing part 305, selecting the survival path svp0 through svp7 which has the smaller value of the two paths meeting in each state, outputting it to the path history calculating part 600, and then outputting the metric value svm0 through svm7 of the selected survival path to the optimal path calculating part 400. Here, the arrangement of the storing metric value stm0 through stm7 and euclidean distance value d0 through d6 input to the path changing part 301 should be the same as the signal group selected in the state transition view of FIG. 9b.

Therefore, the path changing part 301 includes first through fourth multiplexers 301-1 through 301-4 for changing the output path of the storing metric value stm0 through stm7 which is output from the storing part 500 in accordance with the comb filter ON/OFF signal Scomb; and fifth through twelfth multiplexers 303-1 through 303-8 for changing the path by the distance value d0 through d6 output from the distance calculating part 100.

Figure 14:
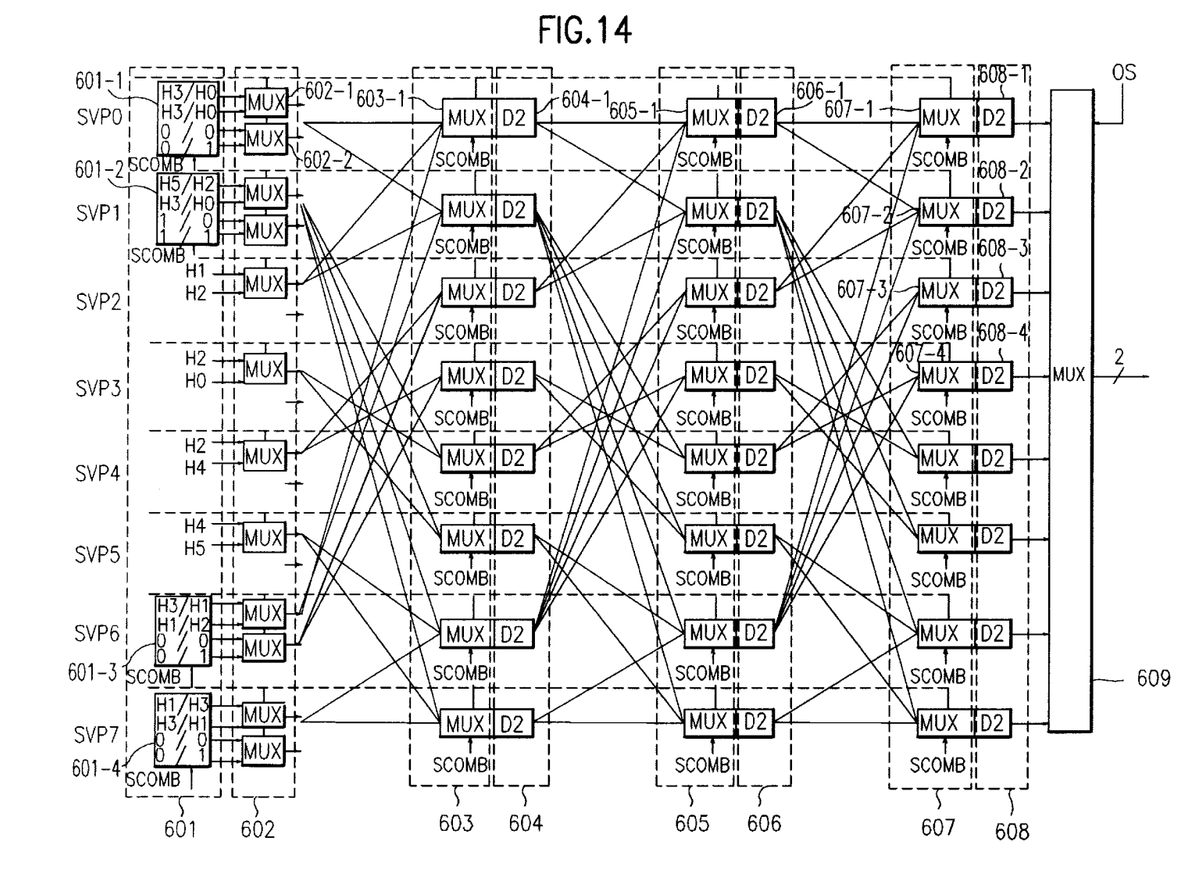
FIG. 14 is a detailed block diagram of a path history calculating part of FIG. 10.

As illustrated in FIG. 14, the path history calculating part 600 will now be described. The first selecting part 601 has a plurality of multiplexers which selectively output the higher bit value h0 through h6 output from the hard decision part 100 and the previously fixed lower bit value in accordance with the comb filter ON/OFF signal Scomb of the determining part 40 to each optimal trellis decoder and partial response trellis decoder. The second selecting part 602 has a plurality of multiplexers which selectively output the higher and the lower bit values output from the first selecting part 601 in accordance with the survival path value svp0 through svp7 of each state of the first observing section. The third selecting part 603 has a plurality of multiplexers which changes the path input to each state of the second observing section according to the comb filter ON/OFF signal Scomb for the exact operation of the optimal trellis decoder and the partial response trellis decoder, selects the survival path of the two paths meeting at each state by being controlled by the survival path value svp0 through svp7 of each state of the second observing section, changes the shifting direction of data, and responds one to one to each state selecting part. A storing part 604 has a plurality of memories connected to each multiplexer of the third selecting part 603 for storing the previous state's higher and lower bit values. The fourth selecting part 605 has a plurality of multiplexers which changes the path input to each state of the third observing section according to the comb filter ON/OFF signal Scomb, selects the survival path of the two paths meeting at each state by being controlled by the survival path value svp0 through svp7 of each state of the third observing section, changes the shifting direction of data, and responds one to one to each state selecting part. A storing part 606 has a plurality of memories connected to each multiplexer of the fourth selecting part 605 for storing the previous state's higher and lower bit values. The fifth selecting part 607 has a plurality of multiplexers which changes the path input to each state of the fourth observing section according to the comb filter ON/OFF signal Scomb, selects the survival path of the two paths meeting at each state by being controlled by the survival path value svp0 through svp7 of each state of the fourth observing section, changes the shifting direction of data, and responds one to one to each state selecting part. A storing part 608 has a plurality of memories connected to each multiplexer of the fifth selecting part 607 for storing the previous state's higher and lower bit values. A multiplexer 609 selects the optimal path of the output paths which is output from each multiplexer of the fifth selecting part 605 by the optimal path selecting signal OS output from the optimal path calculating part 400, and outputs the higher and lower bits of the optimal path stored in the memory which is connected to the corresponding multiplexer. Here, the observing section is four.

The present invention thus structures the optimal trellis decoder and the partial response trellis decoder into one trellis decoder. When the comb filter 30 operates because there is the interference by the co-channel NTSC signal as the externally input signal, and when the comb filter 30 does not operate because there is weak or no interference by the co-channel NTSC signal, the comb filter ON/OFF signal Scomb, which indicates if the data are input to the trellis decoder or not, determines if the optimal trellis decoder and partial response trellis decoder and selectively output the corresponding signal by the multiplexer. Here, if the comb filter signal Scomb is "1", namely, if it is ON, the invention is operated as the partial response trellis decoder. If the comb filter signal is "0", the invention is operated as the optimal trellis decoder. At this time, the distance calculating part 100 is structured for decoding the data corresponding to the lower bit of the two bits prior to encoding in the trellis encoder.

Therefore, if the comb filter signal Scomb is "0", the optimal distance calculating part 101 is selected, and the selected optimal distance calculating part 101 outputs the euclidean distance value d0 through d3 according to the signal value output from the trellis encoder. Here, d0 is the distance value to the closest point of $\{-7, 1\}$ and the input signals. d1 is the distance value to the closest point of $\{-5, 3\}$ and the input signals. d2 is the distance value to the closest point of $\{-3,5\}$ and the input signals. d3 is the distance value to the closest point of $\{-1,7\}$ and the input signals.

If the comb filter signal Scomb is "1", the partial response distance calculating part 103 is selected and the euclidean distance value d0 through d6 is output to the comparing part 300 according to the signal value output from the comb filter 30. Here, d0 is the distance value to the closest point of $\{-14, -6, 2\}$ and the input signals. d1 is the distance value to the closest point of $\{-10, -2, 6\}$ and the input signals. d3 is the distance value to the closest point of $\{-8, 0, 8\}$ and the input signals. d4 is the distance value to the closest point of $\{-6, 2, 10\}$ and the input signals. d5 is the distance value to the closest point of $\{-4, 4, 12\}$ and the input signals. d6 is the distance value to the closest point of $\{-2, 6, 14\}$ and the input signals.

Likewise, in the hard decision part 200, if the comb filter ON/OFF signal Scomb is "0", the optimal hard decision part 201 is selected and outputs the data indicating that the higher one bit is the same as or different from the previous data according to the signal value output from the trellis encoder. If the comb filter ON/OFF signal Scomb is "1", the partial response hard decision part 203 is selected and outputs the data, which indicate that the higher one bit is the same as or different from the previous data according to the signal value output from the trellis encoder, to the path history calculating part 600. Here, as the higher bit of the trellis encoder 21 causes a parallel transition in the trellis state transition diagram, the hard decision part 200 is used therefor because its characteristics of performing the hard decision before the trellis decoding operation, and finally determining after seeing the decoding result of the lower bit later.

Meanwhile, the comparing part 300 sums the euclidean distance value d0 through d6 output from the distance calculating part 100 and the previous metric value stm0 through stm7 stored in the storing part 500 as illustrated in FIG. 13, obtains the respective branch metric value of the two paths meeting at each state, and outputs it to the selecting part 307. The selecting part 307 compares the two branch metric values, selects the lower metric value, outputs the selected branch as the survival history calculating part 600, and outputs the metric value of the survival path to the optimal path calculating part 400. Here, the comparing part 300 outputs the survival metric value svm0 through svm7 by each state. The arrangement of the storing metric value stm0 through stm7 and euclidean distance value d0 through d6 should be the same as the signal group selected in the transition in FIG. 9b. Therefore, the path changing part 301 changes the path of the data which are input according to the comb filter ON signal Scomb, so that the comparing part 300 can perform the operation which is required for each optimal trellis decoder and partial response trellis decoder.

Therefore, if the comb filter signal Scomb is "1", namely, the partial response trellis decoder operates, the first and second multiplexers 301-1, 302-2 select stm2 between stm2 and stm6 output from the storing part 500, and respectively output it to the second summer 305-12 of the first summer set and the second summer 305-22 of the second summer set. The third and fourth multiplexers 301-3, 301-4 select stm5 between stm1 and stm5 output from the storing part 500, and respectively output it to the second summer 305-72 of the seventh summer set and the second summer 305-82 of the eighth summer set. The fifth multiplexer 303-1 selects the distance value d3 between d0 and d3 output from the distance calculating part 100, and outputs to the first summer 305-11 of the first summer set. The sixth multiplexer 303-2 selects the distance value d1 between d1 and d2 output from the distance calculating part 100, and outputs it to the second summer 305-12 of the first summer set. The seventh multiplexer 303-3 selects the distance value d5 between d2 and d5 output from the distance calculating part 100, and outputs it to the first summer 305-21 of the second summer set. The eighth multiplexer 303-4 selects the distance value d3 between d3 and d0 output from the distance calculating part 100, and outputs it to the second summer 305-22 of the second summer set. The ninth multiplexer 303-5 selects the distance value d3 between d3 and d1 output from the distance calculating part 100, and outputs it to the first summer 305-71 of the seventh summer set. The tenth multiplexer 303-6 selects the distance value d5 between d5 and d3 output from the distance calculating part 100, and outputs it to the second summer 305-72 of the seventh summer set. The eleventh multiplexer 303-7 selects the distance value d1 between d1 and d3 output from the distance calculating part 100, and outputs it to the first summer 305-81 of the eighth summer set. The twelfth multiplexer 303-8 selects the distance value d3 between d3 and d1 output from the distance calculating part 100, and outputs it to the second summer 305-82 of the eighth summer set.

Meanwhile, if the comb filter signal Scomb is "0", namely, the optimal trellis decoder operates, the first and second multiplexers 301-1, 302-2 select stm6 output from the storing part 500, and respectively output it to the second summer 305-12 of the first summer set and the second summer 305-22 of the second summer set. The third and fourth multiplexers 301-3, 301-4 select stm1 output from the storing part 500, and respectively output it to the second summer 305-72 of the seventh summer set and the second summer 305-82 of the eighth summer set. The fifth multiplexer 303-1 selects the distance value d0 output from the distance calculating part 100, and outputs to the first summer 305-11 of the first summer set. The sixth multiplexer 303-2 selects the distance value d2 output from the distance calculating part 100, and outputs it to the second summer 305-12 of the first summer set. The seventh multiplexer 303-3 selects the distance value d2 output from the distance calculating part 100, and outputs it to the first summer 305-21 of the second summer set. The eighth multiplexer 303-4 selects the distance value d0 output from the distance calculating part 100, and outputs it to the second summer 305-22 of the second summer set. The ninth multiplexer 303-5 selects the distance value d1 output from the distance calculating part 100, and outputs it to the first summer 305-71 of the seventh summer set. The tenth multiplexer 303-6 selects the distance value d3 output from the distance calculating part 100, and outputs it to the second summer 305-72 of the seventh summer set. The eleventh multiplexer 303-7 selects the distance value d3 output from the distance calculating part 100, and outputs it to the first summer 305-81 of the eighth summer set. The twelfth multiplexer 303-8 selects the distance value d1 output from the distance calculating part 100, and outputs it to the second summer 305-82 of the eighth summer set.

Accordingly, the first summer 305-11 of the first summer set 301-1 sums the stm0 output from the storing part 500 and the distance value d3 or d0 output from the fifth multiplexer 303-1, and obtains the first branch metric value of the 00 or 000 state. The second summer 305-12 sums the storing metric value stm2 or stm6 output from the first multiplexer 301-1 and the distance value d1 or d2 output from the sixth multiplexer 303-2, and obtains the second branch metric value of the 00 or 000 state.

The first summer 305-21 of the second summer set sums stm0 output from the storing part 500 and the distance value d5 or d2 output from the seventh multiplexer 303-3, and obtains the first branch metric value of the 10 or 110 state. The second summer 305-22 sums the storing metric value stm2 or stm6 output from the second multiplexer 301-2 and the distance value d3 or d0 output from the eighth multiplexer 303-4, and obtains the second branch metric value of the 10 or 110 state.

The third through sixth summers calculate the branch metric values of each state only if operating as the partial response trellis decoder. The first summer 305-31 of the third summer set sums stm4 and d4, and obtains the first branch metric value of 100 state. The second summer 305-32 sums stm6 and d2, and obtains the second branch metric value of 100 state. The first summer 305-41 of the fourth summer set sums stm4 and d2, and obtains the first branch metric value of 010 state. The second summer 305-42 sums stm6 and d0, and obtains the second branch metric value of 010 state. The first summer 305-51 of the fifth summer set sums stm1 and d2, and obtains the first branch metric value of 001 state. The second summer 305-52 sums stm3 and d4, and obtains the second branch metric value of 001 state. The first summer 305-61 of the sixth summer set sums stm1 and d4, and obtains the first branch metric value of 111 state. The second summer 305-62 sums stm3 and d6, and obtains the second branch metric value of 111 state.

Meanwhile, the first summer 305-71 of the seventh summer set sums storing metric value stm1 or stm5 output from the third multiplexer 301-3 and the distance value d3 or d1 output from the ninth multiplexer 303-5, and obtains the first branch metric value of 01 or 101 state. The second summer 305-72 sums the storing metric value stm7 output from the storing part 500 and the distance value d5 or d3 output from the tenth multiplexer 303-6, and obtains the second branch metric value of 01 or 101 state.

The first summer 305-81 of the eighth summer set sums storing metric value stm1 or stm5 output from the fourth multiplexer 301-4 and the distance value d1 or d3 output from the eleventh multiplexer 303-6, and obtains the first branch metric value of the 11 or 011 state. The second summer 305-82 sums the storing metric value stm7 output from the storing part 500 and the distance value d3 or d1 output from the twelfth multiplexer 303-8, and obtains the second branch metric value of the 11 or 011 state.

Meanwhile, the selecting part 307 leaves the survival path of the two paths meeting at each state, and discards the rest one path in order to chase the optimal input value. Here, to chase the most optimal survival path, a waveform of the infinite section should be observed, however, a predetermined section is observed for simplifying the structure of the hardware, and the optimal path in the observing section is selected to thereby output each input value. Two paths meeting at each state are fixedly formed at each section, and have the data value of "0" and "1".

Accordingly, the first selector 307-1 of the selecting part 307 compares the first and second branch metric values of the 00 or 000 state obtained in the first summer set 305-11, 305-12, selects the smaller metric value of the two as the survival path, and outputs the survival metric svp0 and its metric value svm0.

The second selector 307-2 compares the first and second branch metric values of the 10 or 110 states obtained in the second summer set 305-21, 305-22, selects the smaller metric value of the two as the survival path, and outputs the survival metric svp1 and its metric value svm1. The third selector 307-3 compares the first and second branch metric values of 100 state obtained in the third summer set 305-31, 305-32, selects the smaller metric value of the two as the survival path, and outputs the survival metric svp2 and its metric value svm2. The fourth selector 307-4 compares the first and second branch metric values of the 010 state obtained in the fourth summer set 305-41, 305-42, selects the smaller metric value of the two as the survival path, and outputs the survival metric svp3 and its metric value svm3. The fifth selector 307-5 compares the first and second metric values of the 010 state obtained in the fifth summer set 305-51, 305-52, and outputs the survival path svp4 and its metric value svm4. The sixth selector 307-6 compares the first and second metric values of the 111 state obtained in the sixth summer set 305-61, 305-62, and outputs the survival path svp5 and its metric value svm5. The seventh selector 307-7 compares the first and second metric values of the 01 or 101 state obtained in the seventh summer set 305-71, 305-72, and outputs the survival path svp6 and its metric value svm6. The eighth selector 307-8 compares the first and second metric values of 11 or 011 state obtained in the eighth summer set 305-81, 305-82, and outputs the survival path svp7 and its metric value svm7. The metric values svm0 through svm7 of the survival path selected at each state are applied to the optimal path calculating part 400. The survival paths svp0 through svp7 selected at each state are applied to the path history calculating part 600.

Here, the optimal path calculating part 400 selects the optimal survival path, that is the pass having the minimum metric value among the survival metric values of each state output from the comparing part 300, outputs this value OS to the path history calculating part 600, and simultaneously normalizing the survival metric value of each state with the minimum metric value to thereby store it in the storing part 500. That is, the optimal path calculating part 400 selects the path having minimum metric value among the survival paths input by each state as the optimal path. The optimal path should compare the entire input and the entire path. Then, the delay is too great and the hardware becomes complicated. Therefore, after observing a predetermined length, the optimal path by that section is output. Thus, the comparing part 300, optimal path calculating part 400 and storing part 500 repeat the above operation by each state of the observing section.

Meanwhile, if the survival path is selected in every observing section, the path history calculating part 600 chases the survival path value of the first section among the observing sections and outputs the value. Here, the path history calculating part 600 should also change the path of the data input according to the comb filter ON/OFF signal Scomb so that the respective operations of the optimal trellis decoder and the partial response trellis decoder can be performed. That is, in case of operating as the partial response trellis decoder (comb filter signal is "1"), the first multiplexer 601-1 of the first selecting part 601 outputs h3, h1 output from the hard decision part 200 as the higher bits, and 0,0 as the lower bits to the second selecting part 602. The first multiplexer 602-1 of the second selecting part 602 selects one of h3 and h1 according to the survival path value svp0 of the first observing section and stores the data to the first memory 604-1 of the storing part 604. Also, the second multiplexer 602-2 stores "0" to the first memory 604-1.

Additionally, the first multiplexer 603-1 of the third selecting part 603 selects the path corresponding to the partial response trellis decoder state transition according to the comb filter ON/OFF signal Scomb and selectively outputs the survival path of the two paths meeting at the 000 state according to the survival path value svp0 of the second observing section. Here, the hard decision value (higher bit) and lower bit loaded in the survival path selectively output from the first multiplexer 603-1 of the third selecting part 603 is stored in the first memory 606-1 of the storing part 606. The first multiplexer 605-1 of the fourth selecting part 605 selects the path corresponding to the partial response trellis decoder state transition by the comb filter ON/OFF signal Scomb, and selectively outputs the survival path of the two paths meeting at the 000 state according to the survival path value svp0 of the third observing section. Likewise, the hard decision value (higher bit) and lower bit loaded in the survival path selectively output from the first multiplexer 605-1 of the fourth selecting part 605 is stored the first memory 608-1 of the storing part 608. The first multiplexer 607-1 of the fifth selecting part 607 selects the path corresponding to the partial response trellis decoder state transition by the comb filter ON/OFF signal Scomb, and selectively outputs the survival path of the two paths meeting at the 000 state according to the survival path value svp0 of the fourth observing section, to the multiplexer 609. As described above, the higher bit and lower bit of each previous state are stored in the memories of the storing parts 604, 606, 608 connected to the third through fifth selecting parts 603, 605, 607.

Meanwhile, when operating as the optimal trellis decoder (comb filter signal is "0"), the first multiplexer 601-1 of the first selecting part 601 outputs h0, h2 output from the hard decision part 200 as the higher bits, and 0,1 as the lower bits to the second selecting part 602. The first multiplexer 602-1 of the second selecting part 602 selects one of h0 and h2 according to the survival path value svp0 of the first observing section and stores the data to the first memory 604-1 of the storing part 604. Also, the second multiplexer 602-2 selects either "0" or "1" and stores it to the first memory 604-1.

Additionally, the first multiplexer 603-1 of the third selecting part 603 selects the path corresponding to the partial response trellis decoder state transition according to the comb filter ON/OFF signal Scomb and selectively outputs the survival path of the two paths meeting at the 00 state according to the survival path value svp0 of the second observing section. Here, the hard decision value (higher bit) and lower bit loaded in the survival path selectively output from the first multiplexer 603-1 of the third selecting part 603 is stored the first memory 606-1 of the storing part 606. The first multiplexer 605-1 of the fourth selecting part 605 selects the path corresponding to the optimal trellis decoder state transition by the comb filter ON/OFF signal Scomb, and selectively outputs the survival path of the two paths meeting at the 00 state according to the survival path value svp0 of the third observing section. Likewise, the hard decision value (higher bit) and lower bit loaded in the survival path selectively output from the first multiplexer 605-1 of the fourth selecting part 605 is stored the first memory 608-1 of the storing part 608. The first multiplexer 607-1 of the fifth selecting part 607 selects the path corresponding to the optimal trellis decoder state transition by the comb filter ON/OFF signal Scomb, and selectively outputs the survival path of the two paths meeting at the 00 state according to the survival path value svp0 of the fourth observing section, to the multiplexer 609. Likewise, each state of every observing section selects the path corresponding to the partial response trellis decoder or optimal trellis decoder state transition according to the comb filter ON/OFF signal, selects the survival path of the two paths meeting at each state according to the survival path value of each observing section output from the comparing part 300, and then repeatedly performs the operation for storing the higher and lower bits of the previous state. Accordingly, the multiplexer 609 selects the survival path having the minimum metric value of the survival paths output from the fifth selecting part 607 according to the optimal path selecting signal OS output from the optimal path calculating part 400, and outputs the higher and lower bits of the previous state stored in the memory. That is, if the output of the fourth multiplexer 607-4 of the fifth selecting part 607 is selected, the fourth memory 608-4 of the storing part 608 is enabled so that the higher and lower bits stored in the fourth memory 608-4 are output through the multiplexer 609. Also, the higher bit output from the multiplexer 609 is output to the multiplexer 800, and simultaneously is predecoded in the differential decoder 700 because it was precoded in the trellis encoder 21, thereby outputting to the multiplexer 800. The multiplexer 800 selects the higher bit output from the multiplexer 609 of the path history calculating part 600 according to the comb filter ON/OFF signal Scomb, or the higher bit predecoded in the differential decoder 700, and selects the selected higher bit as the final higher bit X2. The lower bit output from the multiplexer 609 of the path history calculating part 600 becomes the final lower bit X1.

As described above, in the HDTV receiver of the invention, the united trellis decoder is structured by using the optimal trellis decoder signal group and its state transition, and the partial response trellis decoder signal group and its state transition. Therefore, when the comb filter operates (ON) according to the comb filter ON/OFF signal Scomb, the above united trellis decoder operates as the partial response trellis decoder. When the comb filter does not operate (OFF), the united trellis decoder operates as the optimal trellis decoder, thereby reducing the size of the hardware.

It will be apparent to those skilled in the art that various modifications and variations can be made in the HDTV receiver of the present invention without departing from the spirit or scope of the invention. Thus, it is intended that the present invention cover the modifications and variations of this invention provided they come within the scope of the appended claims and their equivalents.

What is claimed is:

1. A high definition television receiver, comprising:

a comb filter for receiving trellis coded HDTV data, the comb filter turning on if there is interference from an NTSC signal having a co-channel in the data to thereby remove the interference, and the comb filter turning off if there is no interference to thereby pass the received HDTV data;

a determining part for determining if the comb filter is turned on/off and providing a comb filter ON/OFF signal according to the determination result; and a united trellis decoder having united state transitions of a partial response trellis decoder and an optimal trellis decoder, the united trellis decoder having a signal group divided into signal groups of the partial response trellis decoder and the optimal trellis decoder, thereby operating as the partial response trellis decoder according to the comb filter ON signal and operating as the optimal trellis decoder according to the comb filter OFF signal input from the determining part.

2. The high definition television receiver as claimed in claim 1, wherein the united trellis decoder comprises:

a distance calculating part to output at least one of the euclidean distance value from the received HDTV data, and the euclidean distance value from the data which are filtered and output from the comb filter;

a hard decision part to output data that indicates at least one of whether a higher bit is the same as the previous data according to the high definition television data value received from the comb filter ON/OFF signal and whether the higher bit is the same as the previous data according to the signal value output from the comb filter;

a comparing part to sum the euclidean distance value output from the distance calculating part and a storing metric value stored in a storing part at each transition, the comparing part comparing the values of each state, and obtaining and outputting a survival metric value which has a minimum metric value and a survival path;

an optimal path calculating part to select an optimal survival path which has a minimum metric value of every state output from the comparing part to thereby output a optimal survival path selecting signal, and to normalize the survival metric value of each state by the minimum metric value to thereby store in the storing part;

a path history calculating part to select one of the survival paths output from the comparing part according to the survival path selecting signal output from the optimal path calculating part, the path history calculating part chasing the selected optimal path, calculating the survival path value of a first observing section, and outputting two bits prior to encoding by a transmission part;

a differential decoder to differentially decode the higher bit output from the path history calculating part; and a multiplexer to select the higher bit output from the path history calculating part in accordance with the comb filter ON/OFF signal or to selectively output the higher bit output from the differential decoder.

3. The high definition television receiver as claimed in claim 2, wherein the distance calculating part comprises:

an optimal distance calculating part to obtain a euclidean distance value from the high definition television data which is selected by the comb filter OFF signal, encoded in a trellis encoder and then received, in accordance with the comb filter OFF signal; and a partial response distance calculating part to output the euclidean distance value from the high definition television data which are filtered and output from the comb filter by the comb filter ON signal.

4. The high definition television receiver as claimed in claim 2, wherein the hard decision part comprises:

an optimal hard decision part to provide a corresponding hard decision signal by directly hard-deciding the high definition television data received according to the comb filter OFF signal from the determining part; and a partial response hard decision part to provide the corresponding hard decision signal by hard-deciding the high definition television data filtered by the comb filter according to the comb filter ON signal output from the determining part.

5. The high definition television receiver as claimed in claim 2, wherein the comparing part comprises:

a path changing part to properly change the path of the data input according to the comb filter ON/OFF signal so that one of the optimal trellis decoder and the partial response trellis decoder can properly operate;

a summing part having a plurality of value sets to calculate two branch metric values by summing each storing metric value and euclidean distance value stored in the storing part by each state input through the path changing part; and a selecting part to compare the two branch metric values of each state input from the summing part, the selecting part selecting one path as a survival path having the smaller value of the two paths meeting in each state, outputting it to the path history calculating part, and then outputting the metric value of the selected survival path to the optimal path calculating part.

6. The high definition television receiver as claimed in claim 5, wherein the path changing part comprises:

a plurality of multiplexers to change the output path of the storing metric value which is output from the storing part in accordance with the comb filter ON/OFF signal; and a plurality of multiplexers to change the path by the distance value output from the distance calculating part.

7. The high definition television receiver as claimed in claim 2, wherein the path history calculating part comprises:

a first selecting part having a plurality of multiplexers which selectively output the higher bit value output from the hard decision part and the previously fixed lower bit value according to the comb filter ON/OFF signal, so that optimal trellis decoder function or partial response trellis decoder function can be properly performed;

a second selecting part having a plurality of multiplexers which selectively output the higher and the lower bit values output from the first selecting part in accordance with the survival path value of each state of the first observing section;

a third selecting part having a plurality of multiplexers to change the path input to each state of the second observing section according to a comb filter ON/OFF signal so that one of the optimal trellis decoder and the partial response trellis decoder can properly operate, the third selecting part selecting the survival path of the two paths meeting at each state by being controlled by the survival path value of each state of the second observing section, changing the shifting direction of data, and responding by one to one to each state selecting part;

a first storing part having a plurality of memories connected to each multiplexer of the third selecting part, the storing part storing the previous state's higher and lower bit values;

a fourth selecting part having a plurality of multiplexers to change the path input to each state of a third observing section according to the comb filter ON/OFF signal, the fourth selecting part selecting the survival path of the two paths meeting at each state by being controlled by the survival path value of each state of the third observing section, changing the shifting direction of data, and responding by one to one to each state selecting part;

a second storing part having a plurality of memories connected to each multiplexer of the fourth selecting part and for storing the previous state's higher and lower bit values;

a fifth selecting part having a plurality of multiplexers to change the path input to each state of a fourth observing section according to the comb filter ON/OFF signal, the fifth selecting part selecting the survival path of the two paths meeting at each state by being controlled by the survival path value of each state of the fourth observing section, changing the shifting direction of data, and responding by one to one to each state selecting part;

a third storing part having a plurality of memories connected to each multiplexer of the fifth selecting part, the storing part storing the previous state's higher and lower bit values; and a multiplexer unit to select the optimal path of the output paths which is output from each multiplexer of the fifth selecting part by the optimal path selecting signal output from the optimal path calculating part, and outputting the higher and lower bits of the optimal path stored in the memory which is connected to the corresponding multiplexer.

* * * * *